US005770288A

United States Patent [19]

Carney, Jr.

[11] Patent Number: 5,770,288

[45] Date of Patent: Jun. 23, 1998

[54] LABEL WITH REMOVAL SLIT

[76] Inventor: Robert S. Carney, Jr., 4232 Colfax Ave. South, Minneapolis, Minn. 55409

[21] Appl. No.: 733,249

[22] Filed: Oct. 18, 1996

[51] Int. Cl.$^6$ ................................ B32B 3/10; B32B 3/06; B32B 7/06

[52] U.S. Cl. ........................... 428/40.1; 428/43; 428/136; 428/194; 428/195; 428/202; 283/81

[58] Field of Search ................................ 428/40.1, 41.8, 428/43, 136, 194, 195, 202; 283/81, 103, 105

[56] References Cited

U.S. PATENT DOCUMENTS 4,771,891 9/1988 Sorensen et al. ....................... 206/459

*Primary Examiner*—Alexander Thomas
*Attorney, Agent, or Firm*—Dorsey & Whitney LLP

[57] ABSTRACT

A label, comprising a label layer and a release layer, for general use in labeling objects. The label layer has a first side and a second side. The first side of the label layer forms a surface for receiving and retaining indicia. On the second side of the label layer, the peripheral edge is coated with a border of adhesive material, termed “primary adhesive material”, which may be continuous, or which may have one or more small gaps. Within the peripheral edge border of primary adhesive material, there may be one or more areas of the same primary adhesive material, and one or more areas coated with either no adhesive material or with a weaker adhesive material, or with deadened primary adhesive material. The area(s) of primary adhesive material, including the border area(s) and the discontinuous inner area(s), form the primary adhesive bond between the label layer and a labeled object.

One or more small slits or holes is cut into the label layer. The one or more small slits or holes may be near one peripheral edge, and may also be near a gap in the adhesive border on the second side of the label layer. A line of weakness extends from the slit(s) or hole(s) to a near peripheral edge of the label layer. On the second side of the label layer, at least part of the edge of at least one slit or hole borders an area coated with either no adhesive material or a weaker adhesive material.

20 Claims, 15 Drawing Sheets

LABEL WITH REMOVAL SLIT

TECHNICAL FIELD

The present invention relates to labels generally, and in particular to labels intended to be permanently applied once, and to be easily removable from a labeled object if and when removal is desired, leaving the labeled object undamaged and with minimal or no label residue.

BACKGROUND OF THE INVENTION

Current manufactured pressure sensitive labels typically comprise a sheet or roll of diecut labels with a continuous surface of label material having a first side intended to receive and retain indicia, and a second side having a continuous coating of adhesive material to secure the label to a labeled object. These manufactured labels may be applied to objects either manually or through automated label applicators.

When a manufactured pressure sensitive label is coated with an adhesive material and applied to an object, the adhesive bond will typically increase over time, due to flow of the adhesive material into irregularities of the surface of the labeled object. Unless this adhesive flow is controlled or inhibited in some way, the increase in adhesive bond strength over time can be significant, and can result in labels that cannot be removed without damaging or destroying the label.

In many instances, labels are applied to a labeled object with the anticipation that it may be desirable at some future time to remove the label. As one example, when metal cans of food or other household items are labeled, it may be desirable to remove the label to facilitate recycling the metal container. As a second example, data storage objects are often labeled to identify stored data, and then relabeled when the stored data changes.

Some recent inventions intended to improve the removability of manufactured pressure sensitive labels pertain to properties of the adhesive material associated with composition of the material or application of the material. One such example is the use of an adhesive coating containing a mixture of "elastic micro-balls". See U.S. Pat. No. 4,735,837. A second example is the use of calotte shaped adhesive bonding sites printed onto label material. See U.S. Pat. No. 4,587,152. The result of both of these innovations can be generally characterized as inhibiting the flow of adhesive into surface irregularities, and thus inhibiting the increase over time of the strength of the bond between the label and the labeled object, resulting in labels that are easier to remove.

As a result of recent inventions such as those cited above, label adhesive materials are now often classified as permanent-type adhesives or removable adhesives, based on the force required to peel (peel force) a one inch sample strip at right angles from a stainless steel surface. Standards and procedures for measuring peel forces have been established by the pressure sensitive tape council. The designation "permanent adhesive" is normally applied to adhesive having peel forces in the order of three pounds or more, while adhesives having a peel force of less than two pounds are normally referred to as removable adhesive coatings.

A second approach to improving the removability of manufactured pressure sensitive labels or label sections pertains to use of a discontinuous pattern of adhesive material. One example of this approach is an invention comprising a label structure intended to be permanently attached to an object, but having one section capable of functioning as a resealable flap by means of use of a discontinuous coating of a permanent adhesive. See U.S. Pat. No. 4,771,891. A second example is a recent invention specifically intended for data storage objects, comprising an adhesive surface with a polka dot pattern of removable adhesive surrounded by areas of reduced adhesive strength.

It is often desirable for removable labels to have two properties: first, that the label will remain permanently attached until removal is desired, and second, that the label may be easily removed when removal is desired, leaving little or no residue of label material on the labelled object. In some specific applications a third property is desired of removable labels, that removal of the label will not damage the labelled object when it is removed. As one example, when a label is removed from a computer diskette, the plastic diskette case may bend in the process of removal, and this bending may cause damage to the magnetic coating of the encased disk. In some specific applications a fourth label property is desired, that the label, although torn when removed, can still be used for recordkeeping regarding the content of the labeled object as of a specific date and/or time. As one example, if recyclable containers are used for medical or biological tests, it may be desirable to remove the label after a test is completed, but to then place the label in a book documenting information about the test.

In some specific instances it may be desirable to record the date of first use of a specific labeled object. As an example, over time the strength of the magnetic field of the material used to store data on a diskette can deteriorate, even if the diskette is stored securely. To maintain a high level of certainty regarding the reliability of data stored on a data storage object, it is desirable to have a label with one section to remain on the object permanently and to record the date the object went into service, while a second label section can be removed and replaced one or more times.

SUMMARY OF THE INVENTION

A label, comprising a label layer and a release layer, for general use in labeling objects. The label layer has a first side and a second side. The first side of the label layer forms a surface for receiving and retaining indicia. On the second side of the label layer, the peripheral edge is coated with a border of adhesive material, termed "primary adhesive material", which may be continuous, or which may have one or more small gaps. Within the peripheral edge border of primary adhesive material, there may be one or more areas of the same primary adhesive material, and one or more areas coated with either no adhesive material or with a weaker adhesive material, or with deadened primary adhesive material. Adhesive material can be deadened by printing or applying an ink, varnish or other material onto the adhesive material. It will be understood that whenever the term "weaker adhesive material" is used, this term will comprise deadened primary adhesive material. The area(s) of primary adhesive material, including the border area(s) and the discontinuous inner area(s), form the primary adhesive bond between the label layer and a labeled object. Alternatively, there may be no area of primary adhesive material inside the peripheral edge border of primary adhesive material.

One or more small slits or holes is cut into the label layer. The one or more small slits or holes may be near one peripheral edge, and may also be near a gap in the adhesive border on the second side of the label layer. A line of weakness extends from the slit(s) or hole(s) to a near peripheral edge of the label layer. On the second side of the label layer, at least part of the edge of at least one slit or hole borders an area coated with either no adhesive material or a weaker adhesive material.

In use, the label is detached from the release layer and applied to a labeled object. The label may be first placed with little or no pressure, then removed and repositioned, one or more times. Once the label has been satisfactorily positioned on the labeled object, the areas of primary adhesive material are intended to secure the label permanently to the labelled object. However, if removal of the label is desired, a person can pick with a fingernail or a pointed object at the slit(s) or hole(s), tearing the label to a peripheral edge along the line of weakness. By pulling on the torn edges, the label can then be easily detached from the labeled object. The label is thereby damaged, and is not intended to be reusable as it was originally applied, although the torn label can still be used for recordkeeping purposes regarding the object the label had been used on.

In an alternative embodiment, the label of the present invention comprises two sections separated by a line of weakness. The second side of the first label section is entirely or substantially coated with a primary adhesive material. The second side of the second label section comprises a border of primary adhesive material around the label peripheral edge of the second label section, which may be a continuous border or which may have one or more small gaps, one or more areas within the adhesive border having no adhesive and/or a weaker adhesive, one or more areas within the adhesive border having a coating of primary adhesive, one or more slits or holes, and one or more lines of weakness connecting a slit or hole with a label peripheral edge of the second label section.

The use of the alternative embodiment is similar to the first use as described above, however, when removal is desired the second label section may be torn at the line of weakness between the first and second label sections, whereby the first label section remains permanently affixed to the labeled object. Subsequent second label sections may then be detached from the first label section along the line of weakness, and then applied to the labelled object, whereby the subsequent second label sections bear more current information regarding the content of the labelled object, and can be subsequently removed for continued relabeling of the labelled object, while the original first label section bears earlier information, such as when the object first went into service.

One object of the present invention is to provide a label which can be permanently placed on a labeled object, and which will continue to adhere to the labeled object for a long period of time.

Another object of the present invention is to provide a label which can be easily removed from a labeled object with little or no residue of label material remaining on the labeled object, if and when removal is desired.

Another object of the present invention is to provide a label which can be easily removed from a labeled object without damage to the labeled object.

Another object of the present invention is to provide a label which, although torn when removed, can still be used for recordkeeping regarding the use or content of a labeled object.

Another object of the present invention is to provide a label comprising two sections, such that when the second label section is removed and/or replaced, the first label section can remain in place and continue to bear and display earlier information.

DETAILED DESCRIPTION AND EMBODIMENTS OF THE INVENTION

Figure 1:
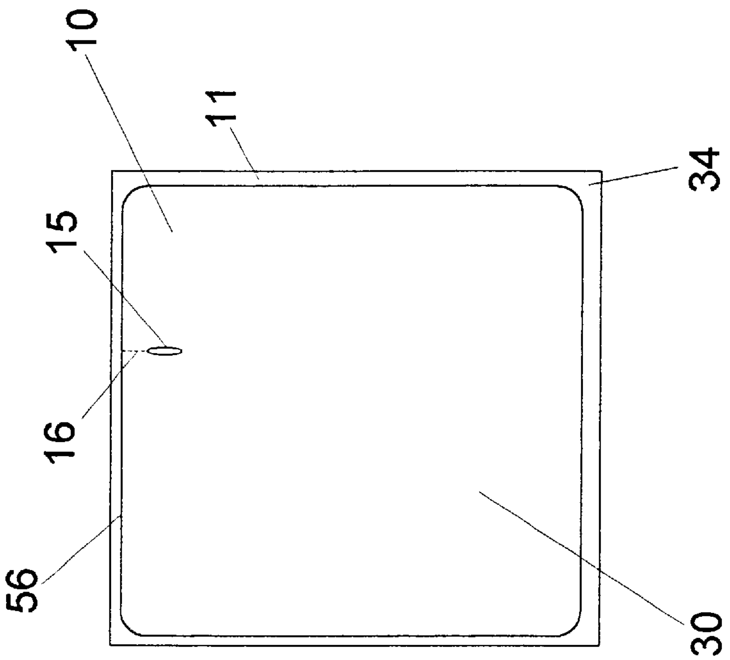
FIG. 1 shows a front view of the label of the present invention having one slit or hole, and one line of weakness.
Figure 4:
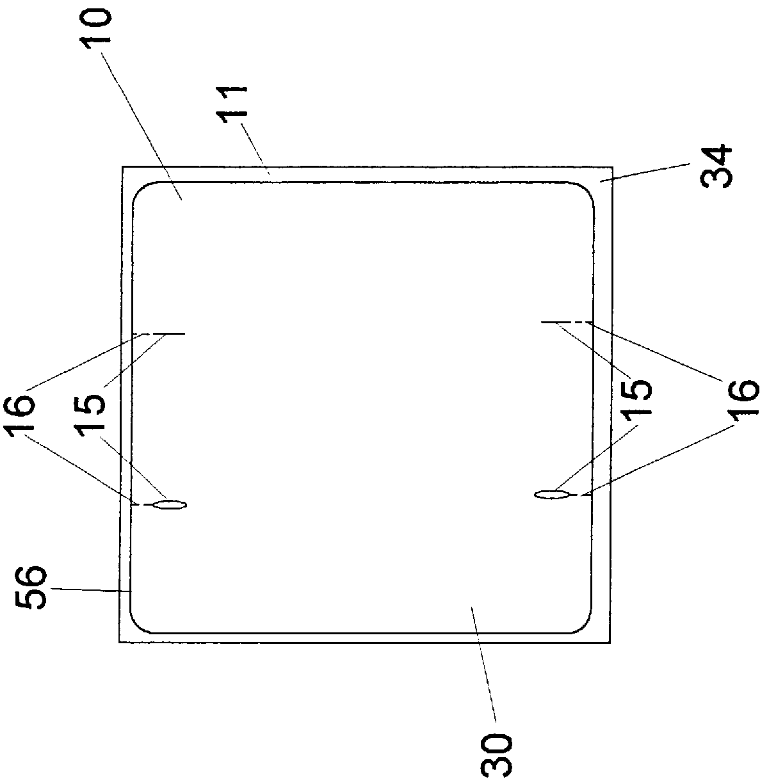
FIG. 4 shows a front view of the label of the present invention having multiple slits and holes, and multiple lines of weakness.
Figure 12:
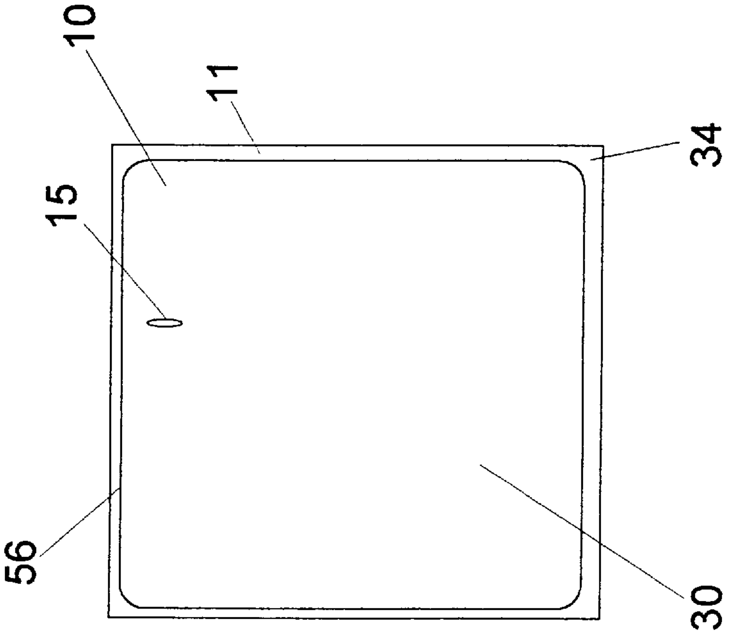
FIG. 12 shows a front view of the label of the present invention having one slit and no line of weakness.
Figure 13:
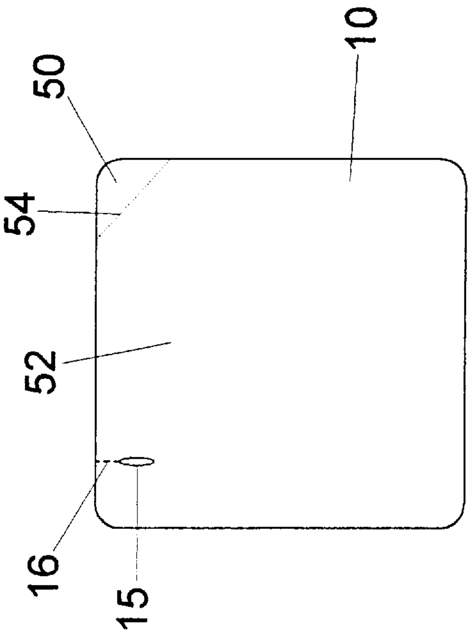
FIG. 13 shows a front view of the label of the present invention having a first section and a second section.
Figure 14:
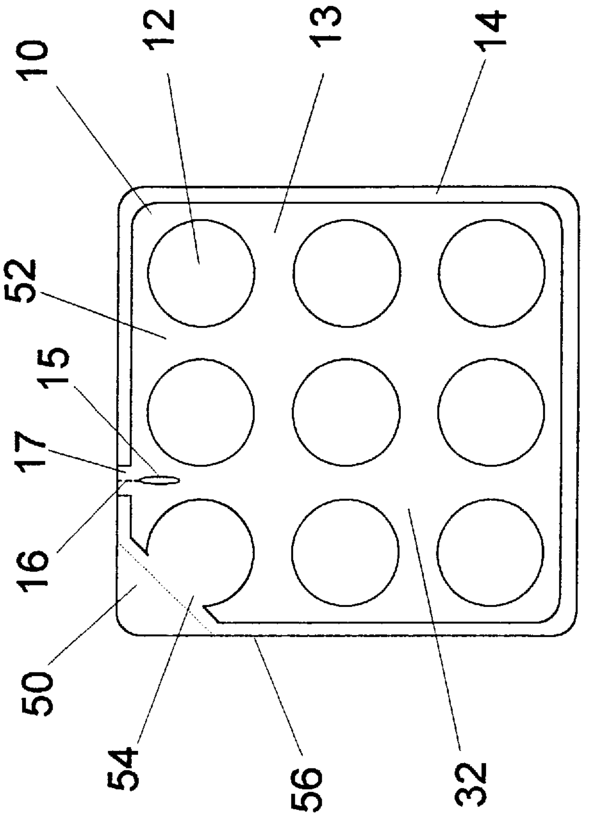
FIG. 14 shows a rear view of the label of the present invention having a first section and a second section.

FIG. 1 shows a front view of the label layer component 10 and the release layer component 11 of the present invention. A line of weakness 16 is between a slit or hole 15, and the label layer peripheral edge 56. FIG. 4 shows a front view of a label similar to the label of FIG. 1, but having multiple slits and holes 15, and multiple lines of weakness 16. Although it is preferable to have a line of weakness 16 from the slit or hole 15 to the label peripheral edge 56, the present invention can be practiced while omitting such a line of weakness 16, as shown in FIG. 12 where there is no line of weakness between the slit or hole 15 and the label peripheral edge 56.

Figure 2:
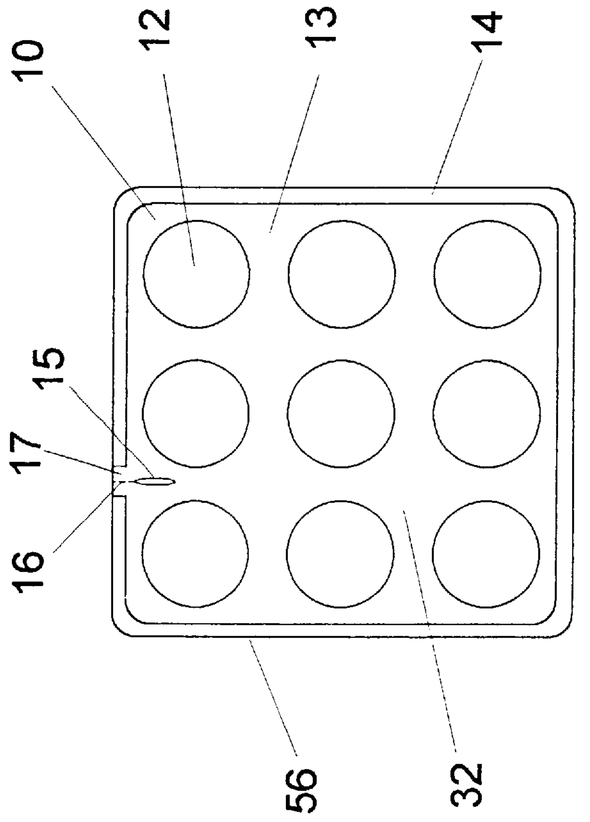
FIG. 2 shows a rear view of the label of the present invention having one slit or hole, one line of weakness, and one gap in the adhesive border.
Figure 3:
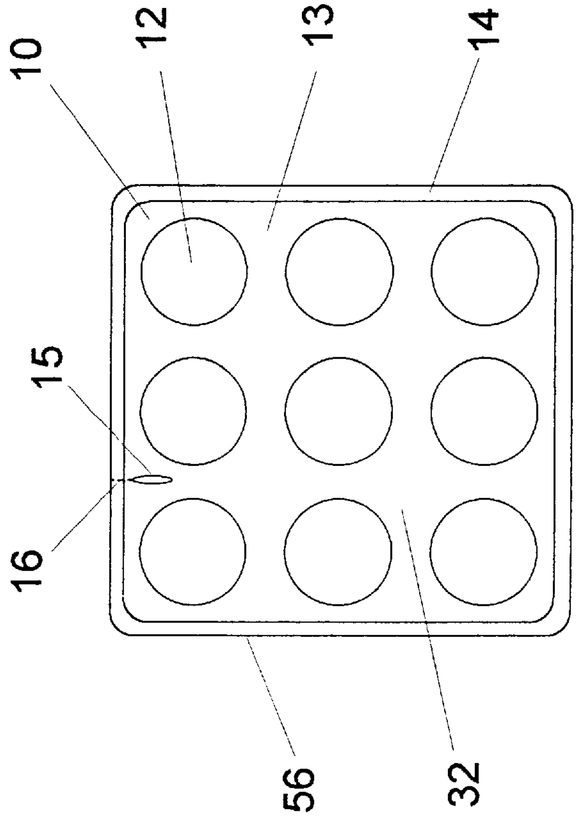
FIG. 3 shows a rear view of the label of the present invention having one slit or hole, one line of weakness, and no gap in the adhesive border.
Figure 5:
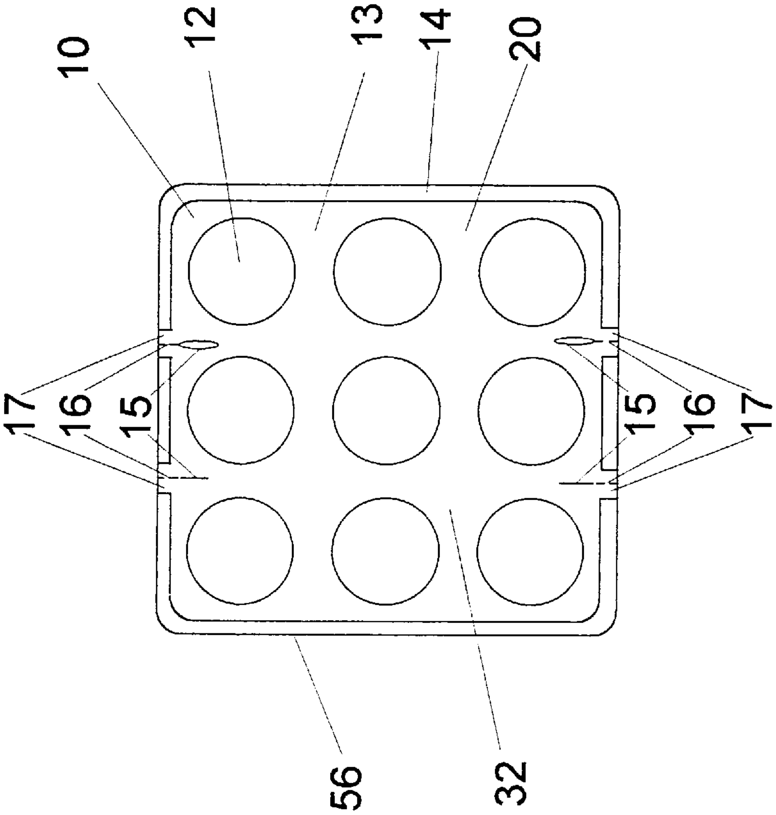
FIG. 5 shows a rear view of the label of the present invention having multiple slits and holes, multiple lines of weakness, and multiple gaps in the adhesive border.
Figure 10:
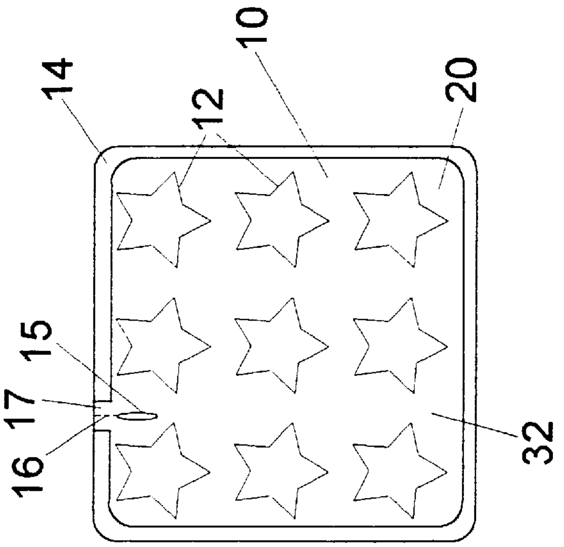
FIG. 10 shows a rear view of the label of the present invention having a star pattern of primary adhesive and areas of weaker adhesive.
Figure 11:
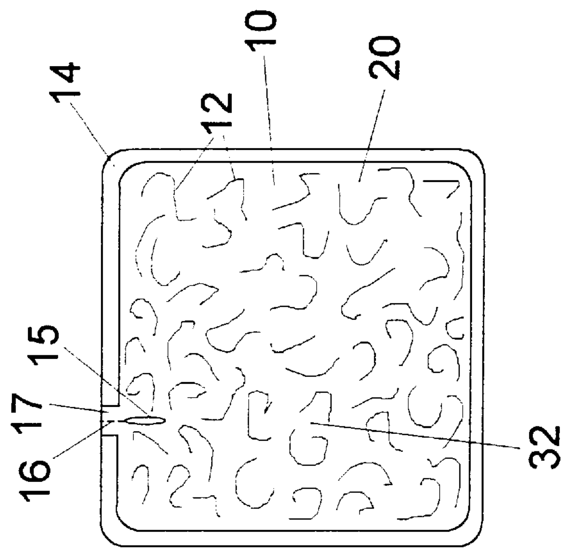
FIG. 11 shows a rear view of the label of the present invention having a random pattern of primary adhesive.

FIG. 2 shows a rear view of the label layer 10 of the present invention. The label layer peripheral edge 56 has an adhesive border 14 of primary adhesive material, with one gap 17 in the adhesive border. Although it is preferable to have an adhesive gap 17 such as shown in FIG. 2, the adhesive border 14 could also be a continuous border as shown in FIG. 3, having no gap at the label peripheral edge 56. Referring again to FIG. 2, within the adhesive border 14 there is a polka dot pattern of areas of primary adhesive material 12. Although a polka dot pattern is illustrated in FIG. 2, other geometric patterns of primary adhesive could be used, such as a star pattern of primary adhesive 12 as shown in FIG. 10, or random areas of primary adhesive 12 as shown in FIG. 11. It is also possible to have no area of primary adhesive material within the adhesive border 14. Again referring to FIG. 2, between the discontinuous primary adhesive material areas 12, there is a contiguous area 13 having no adhesive properties. Although the area 13 in FIG. 2 is contiguous and has no adhesive properties, the function of the area 13 could also be accomplished by discontinuous areas, and alternatively, the area 13 could comprise either weaker adhesive properties, or no adhesive properties, or a combination of weaker adhesive properties and no adhesive properties. FIG. 5 shows a rear view of a label similar to the label of FIG. 2, but having multiple slits and holes 15, and multiple lines of weakness 16.

Figure 7:
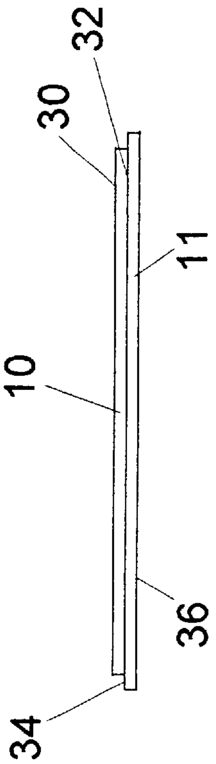
FIG. 7 shows a side view of the label of the present invention.

FIG. 7 shows a side view of a label of the present invention. The label layer 10 comprises a first side 30 which is the face of the label, and which bears and retains indicia, and a second side 32 which is the back of the label and which bears adhesive material(s). The release layer 11 comprises a first side 34, to which the label layer 10 is attached until the label is put into use, and a second side 36.

Figure 8:
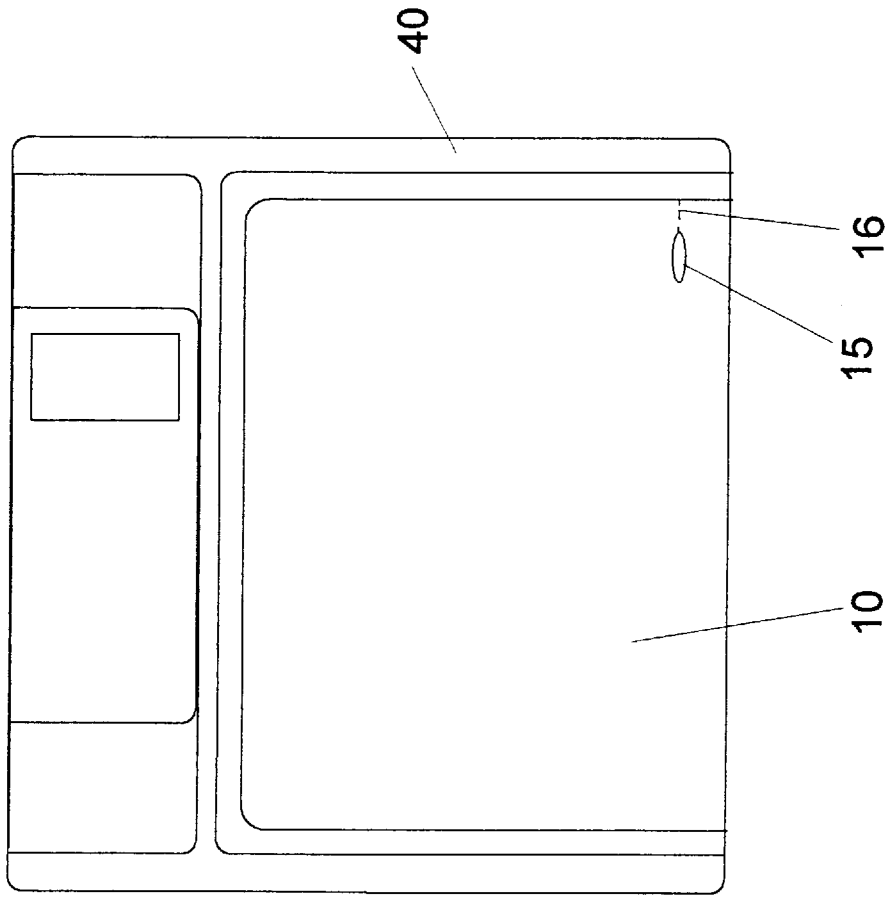
FIG. 8 shows a label of the present invention in use on a computer diskette.
Figure 9:
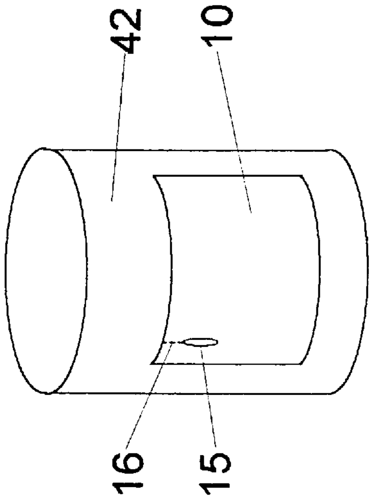
FIG. 9 shows a label of the present invention in use on a food container.
Figure 15:
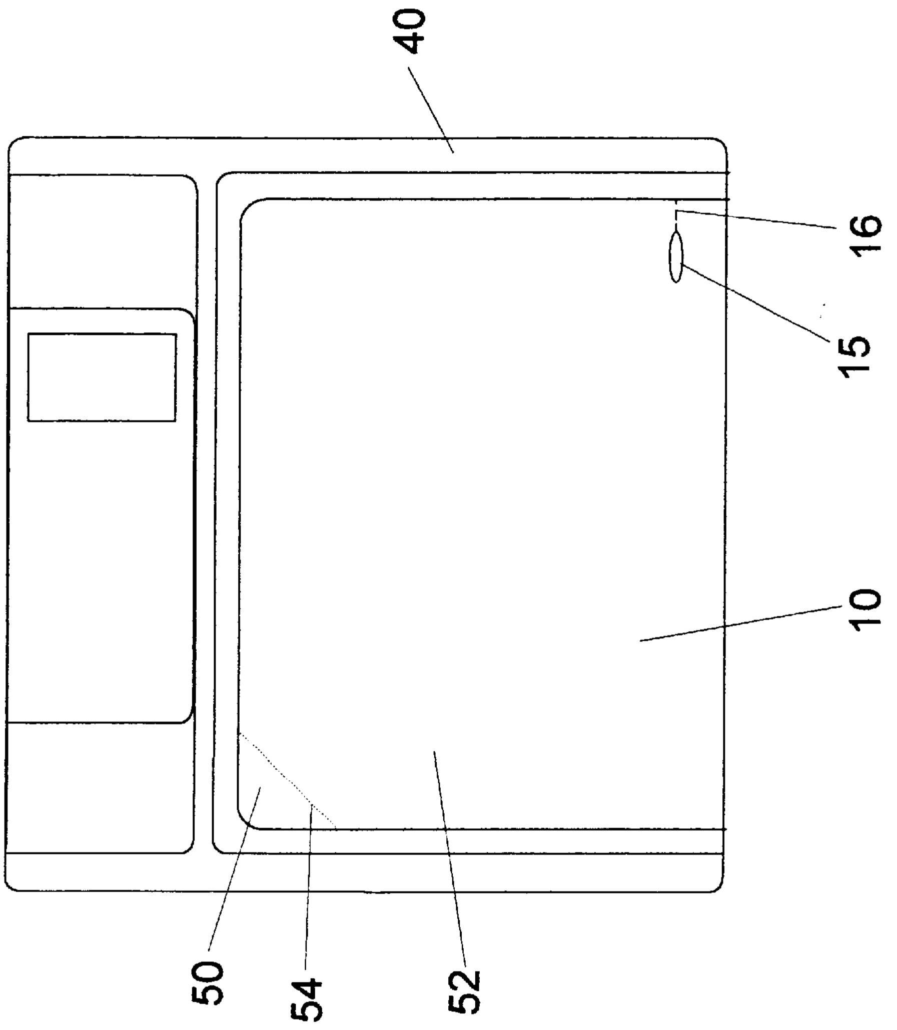
FIG. 15 shows a label of the present invention having a first section and a second section, in use on a data storage object.

FIG. 8 shows a label 10 of the present invention attached to a data storage object 40, specifically, a computer diskette. FIG. 15 shows a label 10 of the present invention, comprising a first label section 50 and a second label section 52, separated by a line of weakness 54, attached to a data storage object 40. FIG. 9 shows a label 10 of the present invention attached to a food container 42.

Figure 6:
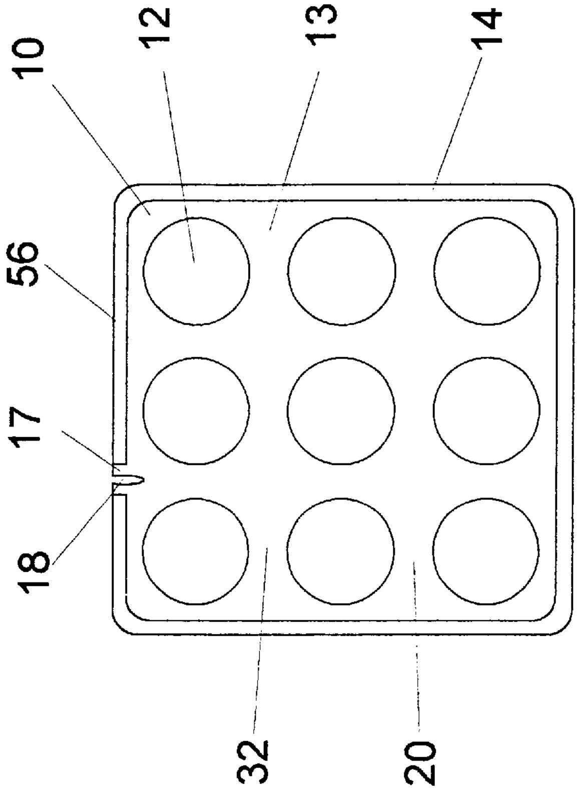
FIG. 6 shows a rear view of an alternative embodiment of the label of the present invention.

FIG. 6 shows a rear view of a possible alternative embodiment of a label 10 of the present invention, where instead of a slit or hole in the label, the geometry of the label peripheral edge 56 is such as to facilitate picking off the label at a point of recess 18. Although this is not viewed as the most desirable embodiment of the present invention because the edge is subject to spontaneous and undesired separation during use of the object, this spontaneous and undesired separation could be mitigated or possibly eliminated through various techniques, and therefore an embodiment such as the one illustrated in FIG. 6 can be seen as a possible alternative embodiment of the present invention in that it facilitates label removal in a way similar to the slit or hole used in currently preferred embodiments of the present invention.

In use, the label layer 10 of the present invention is removed from the release layer 11, and placed on an object, such as the data storage object 40 of FIG. 8 and FIG. 15, or the food container 42 of FIG. 9. Referring to FIG. 8 as an example, when removal of the label is desired, a person can easily remove the label 10 by picking at the slit or hole 15 with a fingernail or other sharp, rigid object, causing the label to tear at the line of weakness 16. The label may then be pulled off the labeled object by grasping one or both of the torn sections. The removed label may then optionally be kept for recordkeeping purposes, to document information regarding the labeled object.

Referring to FIG. 15 as an example for the use of an alternative embodiment of the present invention, the removal of the second label section 52 is accomplished as described above, however the second section 52 of the label 10 is torn at the line of weakness 54, leaving the first section 50 of the label 10 still permanently attached to the data storage object 40. In the use of this alternative embodiment of the present invention, the object can be relabeled one or many times, by first detaching the first and second label sections of a new label along the line of weakness 54, then placing the second label section 52 of the new label at the former location of the second label section 52 of the first label. In this way, the first label section of the first label may continue to retain and display indicia such as when the object first went into use, while the second label section may be removed and/or replaced once or many times.

While preferred embodiments of the present invention have been described, it should be appreciated that various modifications may be made by those skilled in the art without departing from the spirit and scope of the present invention. Accordingly, reference should be made to the claims to determine the scope of the present invention.

What is claimed is:

1. A label for labeling to an object, comprising:

a) a first label layer having a first side and a second side; and b) said first side of said first label layer having no adhesive coating, and forming a front side of said label, and providing a surface for receiving and retaining indicia; and c) said second side of said first label layer having the border of the label peripheral edge coated with a removable primary adhesive material, said peripheral edge border of primary adhesive material being either continuous or having one or more gaps, and said removable primary adhesive material having a peel force of less than three pounds; and d) said first label layer having one or more slits or holes, such that at least one said slit or hole is enclosed within the area bounded by the said peripheral edge border of primary adhesive material, and such that part or all of the peripheral edge of the said at least one slit or hole enclosed within the peripheral edge border of primary adhesive material borders an area on the second side of said first label layer having no adhesive coating or a weaker adhesive coating.

2. The label of claim 1, further comprising said second side of said first label layer having one or more areas within the said adhesive border coated with said removable primary adhesive material, said area(s) being either continuous or discontinuous with the said adhesive border, and said second side of said first label layer having one or more areas within the adhesive border said area(s) having either no adhesive coating, or a weaker adhesive coating, or a combination of no adhesive coating and weaker adhesive coating.

3. The label of claim 2, wherein on the second side of the second label layer, within the adhesive border there are a plurality of areas coated with said primary adhesive material.

4. The label of claim 3, wherein said plurality of areas coated with said primary adhesive material form a polka dot pattern of adhesive and non-adhesive areas.

5. The label of claim 3, wherein said plurality of areas coated with said primary adhesive material form any geometrical pattern.

6. The label of claim 3 wherein said plurality of areas coated with said primary adhesive material are random in size and location.

7. The label of claim 2 wherein said label is a data storage object label.

8. The label of claim 2 wherein said label is a data storage object label, and wherein said data storage object label is removable from said data storage object while causing minimal bending of the surface of said data storage object during the process of removal.

9. The label of claim 2 wherein said label is a food container label.

10. A label, comprising the label of claim 1 as a second label section, together with a first label section, said first and second label sections being defined by a line of weakness, wherein said first label section comprises a first side having no adhesive coating and providing a surface for receiving and retaining indicia, and a second side completely or substantially coated with primary adhesive material, said first sides of said first and second label sections forming a continuous surface, and said second sides of said first and second label sections forming a continuous surface, and when applied to a labeled object, said second label section being removable, and detachable from said first label section at the said line of weakness while said first label section remains on said labeled object.

11. The label of claim 10 wherein said label is a data storage object label.

12. The label of claim 10 wherein said label is a data storage object label, and wherein said data storage object label is removable from said data storage object while causing minimal bending of the surface of said data storage object during the process of removal.

13. The label of claim 10 wherein said label is a food container label.

14. The label of claim 1, further comprising a line of weakness between one or more of the said slits or holes and the label peripheral edge.

15. The label of claim 14, wherein for one or more of the lines of weakness, there is a gap in the label peripheral edge adhesive border on the second side of the first label layer at the point of intersection of the said line of weakness with the label peripheral edge.

16. The label of claim 1, wherein the label is sized for use on a specific intended object, or a class of specific intended objects.

17. The label of claim 1, wherein, prior to using the label, said first label layer is attached to a release layer.

18. The label of claim 1 wherein said label is a data storage object label.

19. The label of claim 1 wherein said label is a data storage object label, and wherein said data storage object label is removable from said data storage object while causing minimal bending of the surface of said data storage object during the process of removal.

20. The label of claim 1 wherein said label is a food container label.

* * * * *